No. 786,916. PATENTED APR. 11, 1905.
E. T. McKAIG.
AUTOMOBILE.
APPLICATION FILED SEPT. 10, 1904.

2 SHEETS—SHEET 1.

Fig. 1.

Witnesses:
J. B. Weir
Robert N. Weir

Inventor:
E. T. McKaig
by Elliott & Hopkins
attys

No. 786,916. PATENTED APR. 11, 1905.
E. T. McKAIG.
AUTOMOBILE.
APPLICATION FILED SEPT. 10, 1904.
2 SHEETS—SHEET 2.
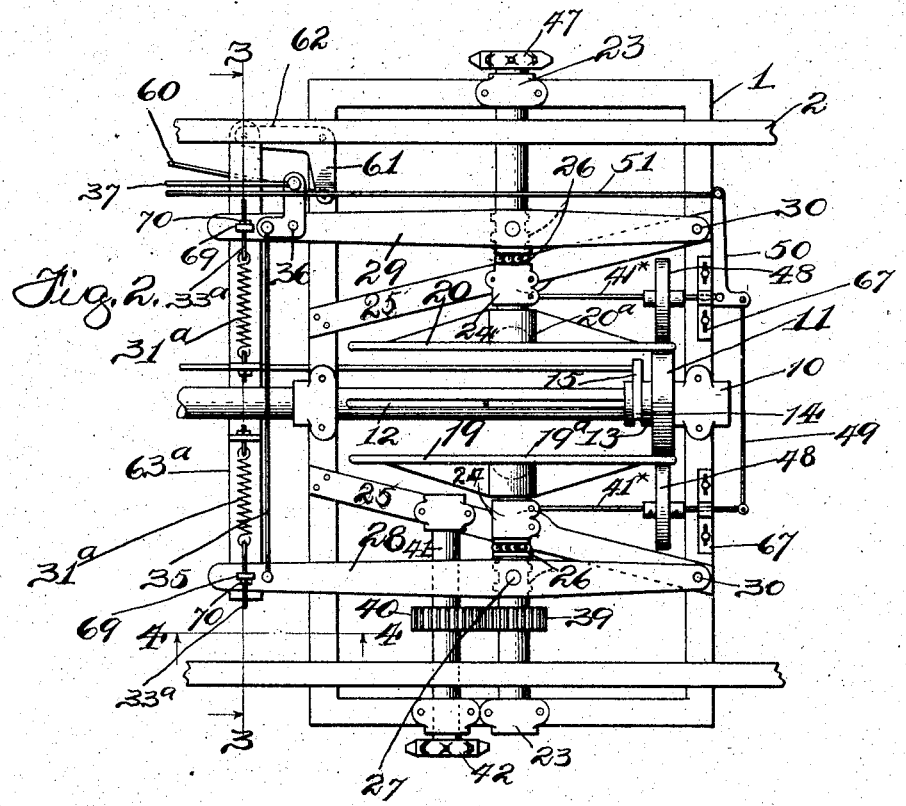
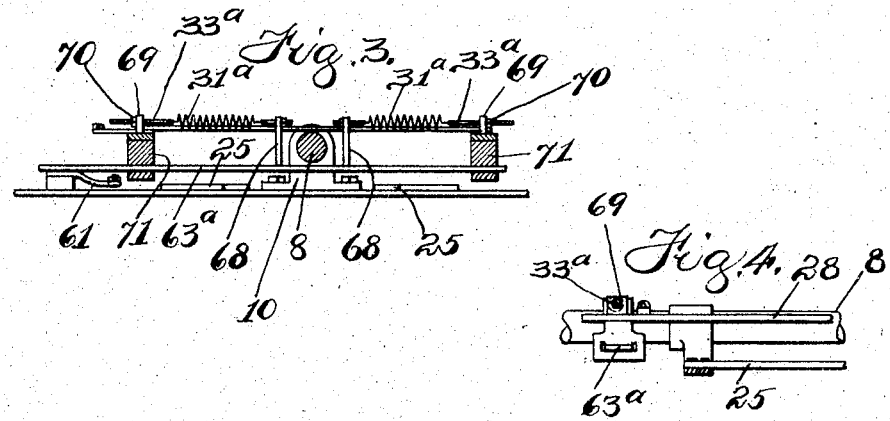
Witnesses: Inventor
E. T. McKaig
by Elliott + Hopkins attys No. 786,916.

Patented April 11, 1905.

UNITED STATES PATENT OFFICE.

EDDY T. McKAIG, OF CHICAGO, ILLINOIS, ASSIGNOR TO McKAIG FRICTION DRIVE VEHICLE CO., OF THE DISTRICT OF COLUMBIA, A CORPORATION OF THE DISTRICT OF COLUMBIA.

AUTOMOBILE.

SPECIFICATION forming part of Letters Patent No. 786,916, dated April 11, 1905.

Application filed September 10, 1904. Serial No. 224,011.

*To all whom it may concern:*

Be it known that I, EDDY T. McKAIG, a citizen of the United States, residing at Chicago, in the county of Cook and State of Illinois, have invented certain new and useful Improvements in Automobiles, of which the following is a full, clear, and exact specification.

My invention relates to the driving and steering mechanisms of automobiles and other like vehicles, and more especially to that type of such mechanisms in which the transmission of power to the axle or driving-wheels is effected through the frictional action of a pulley having its periphery engaging two oppositely-rotating disks; and my invention has for one of its objects to provide improved means for driving in either direction and at a desired speed without the aid of the compensating or equalizing gears heretofore employed.

Another object of my invention is to provide improved means for transmitting the power from both sides of the driving-pulley simultaneously and utilizing the outer edges of the driven disks for the low speed and also increasing the pressure of the disks against the pulley at will when the device is required to do extra hard service.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a plan view of an automobile-chaise provided with my improvements. Fig. 2 is a detail plan view of a modification. Fig. 3 is a cross-section on the line 3 3, Fig. 2; and Fig. 4 is a longitudinal section on the line 4 4, Fig. 2.

In applying my invention to an automobile of the modern type I preferably mount the power-transmitting mechanism on a separate frame, which is shown as of a rectangular form and secured in any suitable way across the main frame 2 of the running-gear, which latter is or may be supported, as usual, upon the front and rear axles 3 4, the former of which is provided with usual steering-wheels 5, connected thereto by suitable steering-knuckles 6, while the latter axle has driving-wheels 7, (shown as rigidly secured to the axle in a well-known way;) but it would of course be no departure from this invention to journal the wheels 7 loosely upon the axle 4 and provide each wheel with appropriate connection with the power-transmitter in the manner well known in this art. In this particular example of the invention, however, the axle 4 is shown as a live axle with the power-transmitting connections secured directly to it in the ordinary way.

8 is a driving-shaft extending longitudinally of the main frame 2 and deriving its motion from any suitable motor, such as an explosion-engine 9. This shaft is shown as mounted upon the frame 1 in suitable bearings or boxes 10, and mounted thereon is a driving-pulley 11, which is provided with any suitable connection with the shaft that will enable the pulley to slide longitudinally of the shaft while rotating in unison therewith. As an example of such connection, I have shown a spline 12, over which a hub 13 on pulley 11 slides; but the term "spline" or "splined" therein may be regarded as generic to any other expedient for accomplishing the described action of the pulley. The hub 13 of the pulley is formed with a groove 14, in which engages a yoke 15, connected by suitable means to an operating device under the control of the operator, so that the position of the pulley 11 with reference to the length of the shaft 8 may be under the control of the operator at all times. This connection may consist of a rod 16, pivotally secured to yoke 15 at one end and at the other end to the lower end of a hand-lever 17, pivoted on any suitable support 18, mounted in any convenient place. Mounted on opposite sides of the pulley 11 are two driven disks 19 20, with the faces of which the periphery of the pulley engages, so that the rotation of the pulley will effect a rotation of the disks 19 20 in opposite directions. These disks are provided with shafts 21 22, respectively, which are mounted in journal-boxes 23 24, the former of which are arranged on the ends of the frame 1, while the latter are arranged on cross bars or braces 25, secured to said frame 1 or other convenient support, and the shafts 21 22 are slidable longitudinally in their respective bearings, so that either or both of the disks 19 20 may be carried out of contact with the pulley 11, thereby rendering either or both of said disks inert and permitting the engine and pulley to continue in operation without transmitting power to the ground or driving wheels. In order that the disks may be pressed against the periphery of the pulley 11 with sufficient force to transmit the power, the shafts 21 22 are provided with grooved shoulders 26, in which engage pins or other suitable devices 27, secured to two levers 28 29, respectively, the latter being pivoted at 30 to the frame 1 at their rear ends and connected together at their forward ends by any suitable connection comprising an elastic medium, such as a spring 31. The connection shown consists of a rod 32, pivoted to lever 29 and connected to one end of spring 31, while the other end of spring 31 is secured to an adjusting-screw 33, threaded in a lug 34 on lever 28, so that the tension of the spring, and consequently the pressure of the disks 19 20 on the pulley, may be varied if necessary. In order that both levers 28 29 may be thrown apart simultaneously when it is desired to render both disks 19 20 inert—at such times, for example, as when it may be desired to stop the vehicle or to start the motor—the forward end of the lever 28 is pivoted to a rod 35 at one end and to one arm of a bell-crank lever 36 at the other end, and this bell-crank lever is pivoted to the other lever 29 and connected by a rod 37 to a pedal or foot lever 37, so that by pressing the latter the disks 19 20 will be thrown apart, and when the pressure of the foot is released from pedal 38 the spring 31 will again draw the disks inwardly against the pulley 11.

Inasmuch as the action of the pulley 11 drives the disks 19 20 in opposite directions, it is necessary to provide one of the disks with back-gearing connection with the driving axle or wheels. Consequently the shaft 21 is shown with a gear 39 meshing with a gear 40 on a counter-shaft 41, and to this counter-shaft is secured a sprocket 42, over which the chain 43 runs for imparting the motion to the axle 4, which may be provided with two chain-wheels 44 45, one for the chain 43 and the other for another chain 46, which transmits the motion of shaft 22 to axle 4 through the intermediary of sprocket 47, any other suitable connections, however, being substituted for these chains and sprockets, if desired.

With the construction described it will be seen that the machine attains its slowest speed and greatest power when the pulley 11 is at the outer edges of the disk in the position shown in the drawings, and the greatest speed is attained when the pulley 11 is near the center of the disks; but when it is on the dead-center there is no speed at all, and in order that it may not unduly wear while passing the center in the act of reversing the centers of the disks may be hollowed out, as shown at $19^a$ $20^a$, respectively, and in order that the pressure of the disks against the pulley 11 may be greatly augmented at the will of the operator when the pulley is at the outer edges of the disks a pressure-idler 48 is mounted behind, so as to press against each of the disks. These idlers are journaled loosely upon rods or levers $41^x$, pivoted at their inner ends to the boxes 24, respectively, and at their outer ends to a rod 49 and a bell-crank lever 50, respectively, one end of the rod 49 being pivoted to an arm of the bell-crank, while the other arm of the bell-crank, which is elongated, may be placed under the control of the operator by any suitable means, such as a rod 51, extending forward to a foot-lever 52 or other suitable means of operation, so that at the desired time the disks may be pressed firmly against the pulley. This requires very little movement of the idlers 48, and when the foot is released from pedal 52 their pressure against the disks will cease; but, if desired, they may be drawn away from the disks by springs 53.

It is well understood that in turning corners the inside ground-wheels turn slower than the outside wheels, and in order to permit of this unequal speed of the wheels the compensating gear has been employed; but with my invention instead of employing such compensating gear I provide means whereby one of the disks 19 20 is rendered inert, preferably by moving it out of contact with the pulley 11 at such times when this unequal speed of the ground-wheel occurs, so that one of the ground-wheels can run freely and independently of the other one, and consequently produces no undue friction of the disk against the pulley 11 nor causes either of the ground-wheels to slide. This release of one of the disks at such times is preferably effected automatically with the operation of the steering mechanism; but at the same it is desirable that the operation of the steering mechanism be ineffectual to cause this release of the disks excepting when the turn is sufficiently abrupt to cause a material variation in the speed of rotation of the ground-wheels. In order to accomplish these objects, I have provided the shaft or stem 54 of the steering-wheel, which is shown in dotted lines at 55, with a pinion 56, meshing with a sliding rack-bar 57, said rack-bar being mounted in a keeper or guide 58, having any suitable form of support, not necessary to illustrate, and to one end of this rack-bar is pivoted a connection 59, which extends to one of the steering-knuckles 6, while to the other end is pivoted a link or connection 60, which is secured to one arm, 61, of a bell-crank lever pivoted to the frame 1 and having its other arm, 62, pivoted to a cross-bar 63, which extends loosely through a support 64 and has two shoulders 65 66 arranged to engage with the levers 28 29, respectively, when the rack-bar 57 is reciprocated; but in order that sliding movements of said rack-bar occasioned by the usual steering of the machine may not affect the pressure of the disks 19 20 against the pulley 11 the shoulders 65 66 are arranged normally such a distance from the levers 28 29, respectively, that they will not engage said levers excepting when the rack-bar 57 undergoes the extreme movement resulting from making a sharp turn, the distance between the shoulders 65 66 therefore being considerably less than the distance between the levers 28 29. With this construction and arrangement it will be seen that when the steering-wheel 55 is rotated for turning the machine to the right, for example, the rack-bar 57 will be pushed forwardly, and the shoulder 66 will be carried against the lever 29, thereby releasing the disk 20 from pulley 11 and allowing the disk 20 to rotate at a slow rate of speed in harmony with the inside driving-wheel 7, while the propulsion of the machine is maintained by the other disk, whose pressure against the pulley 11 is augmented by this increased pull on the spring 31. When the steering-wheel 55 is turned in the opposite direction, the disk 19 will be similarly thrown out of action or rendered inert by the shoulder 65. It is of course understood, however, that when either disk is thus disengaged from the driving-pulley the idlers 48 must be free to oscillate outwardly on their vibratory rods 41$^x$. The outer ends of these rods are shown as mounted in sliding keepers 67 on the frame 1.

In Figs. 2 to 4 is shown a modification in which the levers 28 29 are connected to a sliding rod 63$^a$ by any suitable elastic or yielding means, such as two springs 31$^a$, and this rod 63$^a$ is connected to the arm 62 of the bell-crank lever, whose other arm 61 is connected to the rear end of rod 60, as before explained, so that when rod 60 is moved back and forth the bar 63$^a$ will be reciprocated and the levers 28 29 alternately applied and released. The springs 31$^a$ and bar 63$^a$, it will be seen, are substituted for the spring 31 and bar 63 of the form shown in Fig. 1. The connection between the inner ends of the springs and the bar 63$^a$ may be effected in any suitable way—as, for example, by lugs 68, rising from the bar 63$^a$ and to which lugs the springs are connected. The outer ends of the springs are connected to the levers 28 29 by means of lugs 69 on said levers and threaded rods 33$^a$ passing therethrough and having nuts 70, whereby the resistance of the springs may be changed to cause more or less pressure of the disks 19 20 against pulley 11. The bar 63$^a$ may be supported in any suitable manner, as by means of blocks or hangers 71, arranged on the under sides of the levers 28 29 and through which hangers bar 63 slides. With this modification the springs 31 may be so adjusted that when one of the levers 28 29 is thrown outwardly by the act of turning the steering-wheel it need not be carried so far as to relieve the disk 19 or 20 entirely from contact with the pulley 11, and the disk on the other side will have its pressure against the pulley correspondingly increased. At the same time it will be observed that during the usual movements of the steering-wheel in turning gradual curves of a radius so great as to render it unnecessary to make any material difference in the speed of rotation of the two traction-wheels the pressure of the disks against pulley 11 will not be materially affected. This elastic connection, however, does not interfere with the operation of the levers 28 29 in unison by the bell-crank 36 and rod 35, as before explained, the springs 31$^a$ and connected parts serving merely to release or relieve the disks 19 20 independently—that is, releasing one or relieving it without relieving or releasing the other—while the bell-crank 36 and rod 35 are utilized for throwing the disks in or out in unison when it is desired to shift the pulley or to stop.

Having thus described my invention, what I claim as new therein, and desire to secure by Letters Patent, is—

1. In an automobile, the combination of a motor, a driving-shaft connected thereto, a driving-pulley splined on said shaft, two opposed driven disks engaging opposite sides of said pulley, longitudinally-movable shafts on which said disks are mounted respectively, a driving-axle connected directly with one of said shafts, a counter-shaft geared to the other of said shafts, and connected directly with the driving-axle, pivoted levers for sliding said shafts respectively, and means for operating said levers in unison or independently.

2. In an automobile, the combination of a motor, a driving-shaft connected therewith, a driving-pulley splined on said shaft, two opposed driven disks movable toward and from each other and engaging said pulley on opposite sides, two pivoted levers operatively connected with said disks respectively for increasing and decreasing their pressure against said pulley, elastic means for pulling said levers toward each other, a bell-crank pivoted to one of said levers, a rod pivoted to one arm of said bell-crank at one end and at the other end to the other of said levers, an operating connection secured to the other arm of said bell-crank, driving-wheels, and means for imparting the rotation of said disks to said driving-wheels.

3. In an automobile, the combination of two opposed disks movable toward and from each other, a pulley arranged between and engaging with said disks, a shaft on which said pulley is mounted, two idlers arranged behind said disks respectively, pivoted levers on which said idlers are mounted, and means for moving said idlers toward and from each other.

4. In an automobile, the combination of two opposed disks movable toward and from each other, a pulley arranged between said disks and engaging therewith, a shaft on which said pulley is mounted, two idlers arranged behind and adapted to engage said disks respectively, pivoted levers on which said idlers are mounted, a bell-crank pivoted to one of said levers and having one of its arms connected to the other of said levers, and means connected with the other arm of said bell-crank for oscillating the bell-crank.

5. In an automobile, the combination of driving-wheels, a steering mechanism, a power-transmitter comprising two independently-operating members, means for driving said members singly and also simultaneously, operative connections between said members and driving-wheels, and means for rendering said members alternately inert by opposite movements of the steering mechanism, the last-said means being so constructed as to allow the steering mechanism to move throughout a part of its throw without rendering said members inert.

6. In an automobile, the combination of driving-wheels, a steering mechanism, a power-transmitter comprising two independently-operating members, means for driving said members singly and also simultaneously, operative connections between said members and driving-wheels, and means comprising a lost-motion connection for rendering the said members alternately inert by opposite movements of the steering mechanism, when the steering mechanism is moved beyond certain points.

7. In an automobile, the combination of driving-wheels, a steering mechanism, a power-transmitter comprising two independently-operating members, means for driving said members singly and also simultaneously, operative connections between said members and driving-wheels, means comprising pivoted levers for alternately rendering said members inert, a rod having a limited movement independently of said levers, means on said rod for engaging and oscillating said levers respectively when the rod is moved in opposite directions beyond a certain point, and an operative connection between said rod and the steering mechanism.

8. In an automobile, the combination of driving-wheels, a steering mechanism, a power-transmitter comprising two driven disks, and means for driving said disks, said disks being movable toward and from each other so as to engage and disengage said driving means, two shifting members operatively connected with said disks for respectively shifting them out of contact with said driving means, means for elastically drawing said shifting members together, a connection extending between said shifting members and comprising two shoulders arranged at a distance from both of said shifting members and adapted to engage them respectively, and means for throwing the last-said connection in opposite directions by opposite movements of the steering mechanism.

9. In an automobile, the combination of a motor, a driving-shaft connected thereto, a driving-pulley slidably connected to said shaft, two opposed driven disks engaging the opposite sides of said pulley simultaneously, longitudinally-movable shafts on which said disks are mounted respectively, driving-wheels, one of which is connected directly with one of said disks, a counter-shaft geared to the other one of said shafts and connected directly with the other one of the driving-wheels, and means for sliding said longitudinally-movable shafts in either direction simultaneously or independently.

10. In an automobile, the combination of two opposed disks movable toward and from each other, a pulley arranged between and engaging with said disks, a shaft on which said pulley is mounted, two idlers arranged behind said disks respectively in such a position that each of the disks will be between the inner edge of one of the idlers and one edge or side of said pulley, said idlers being movable toward and from said disks, and means under the control of the operator for thus moving the said idlers.

11. In an automobile, the combination of two opposed disks movable toward and from each other, a pulley arranged between and engaging said disks, a shaft on which said pulley is mounted, two pivoted levers connected with said disks respectively, a spring connecting said levers together, a lever pivotally mounted on one of said first levers, a rod connecting one arm of the last-said lever to the other of the first-said levers, and means under the control of the operator connected to the other arm of said pivotally-mounted lever.

EDDY T. McKAIG.

Witnesses:
FRANCIS A. HOPKINS,
M. B. ALLSTADT.